Oct. 16, 1934.　　B. M. LOFQUIST ET AL　　1,977,235
BICYCLE PEDAL MECHANISM
Filed May 24, 1933

Inventors
Bror M. Lofquist
Sixten J. Olson
By Attorneys
Southgate Hay & Hawley

Patented Oct. 16, 1934

1,977,235

UNITED STATES PATENT OFFICE 1,977,235

BICYCLE PEDAL MECHANISM

Bror M. Lofquist and Sixten J. Olson, Fitchburg, Mass.

Application May 24, 1933, Serial No. 672,654

3 Claims. (Cl. 208—70)

This invention relates to a driving mechanism for bicycles and particularly to an improved construction of pedal mechanism by which the effort of the rider may be more advantageously applied.

More specifically, our invention relates to a novel construction by which the leverage on the power stroke is increased without increasing the foot travel or decreasing the ground clearance.

Our invention further relates to arrangements and combinations of parts which will be hereinafter described and more particularly pointed out in the appended claims.

A preferred form of the invention is shown in the drawing, in which

Figure 1:
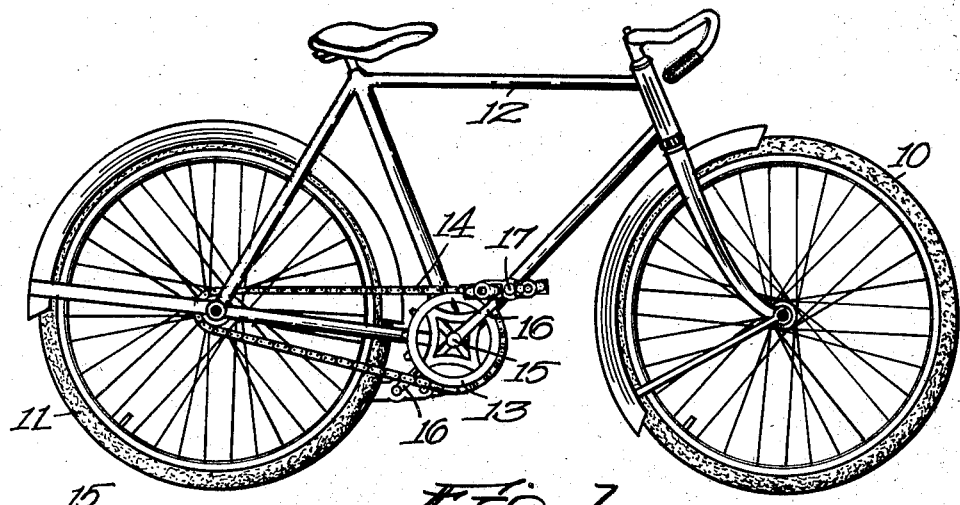
Fig. 1 is a side elevation of a bicycle embodying our improvements.

Referring to the drawing, we have shown a bicycle of the usual type comprising wheels 10 and 11, a frame 12, a sprocket 13, and a chain 14 connecting the sprocket 13 to a smaller sprocket associated with the rear wheel 11, all of these parts being of the usual construction.

Figure 2:
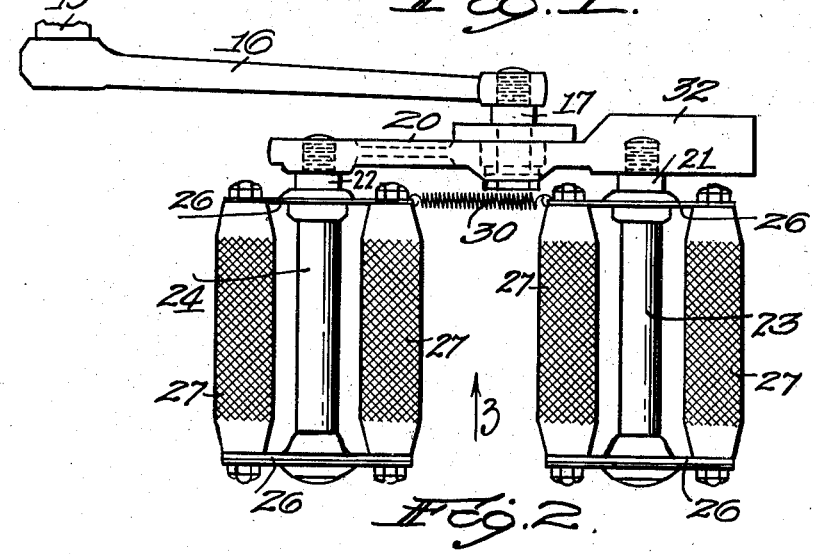
Fig. 2 is an enlarged plan view of one of the pedals.
Figure 3:
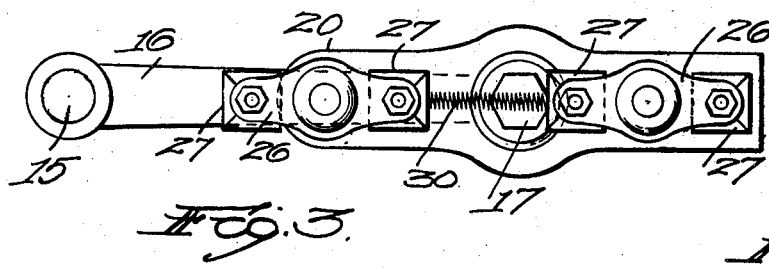
Fig. 3 is a front elevation thereof looking in the direction of the arrow 3 in Fig. 2.

A crank shaft 15 (Fig. 2) is mounted in the usual crank shaft bearing in the frame 12 and is provided with crank arms 16, each having a pedal stud 17 secured therein.

A pedal frame 20 is mounted for free rotation on each pedal stud 17 and supports two pedal bearing members 21 and 22.

Pedals 23 and 24 are rotatably mounted on the pedal bearing members 21 and 22 respectively, and each pedal 23 or 24 preferably comprises end plates 26 having foot-engaging members 27 supported thereby. The members 27 are all preferably spaced equally from the axes of the pedals 23 and 24.

It will be particularly noted, however, that the bearing members 21 and 22 are unequally spaced from the axis of the pedal stud 17. As shown in the drawing, the bearing member 22 is at a substantially greater distance from the axis of the stud 17 than the bearing member 21.

A light coil spring 30 preferably connects portions of the end plates 26 of the pedals 23 and 24 and yieldingly holds the pedals 23 and 24 substantially in alignment with each other.

As the pedal 24 is at a substantially greater distance from the axis of the pedal stud 17 than the pedal 23, the pedal frame 20 is counterweighted, as indicated at 32, to offset this increased leverage and the entire pedal structure is substantially balanced about the axis of the stud 17.

Having described the details of construction of our improved pedal mechanism, the operation and advantages thereof will be readily understood.

Under normal conditions each pedal mechanism will be positioned as indicated in the drawing, with the outer pedal 23 under the ball portion of the rider's foot and with the inner pedal 24 engaged by the heel portion of the rider's foot. As the force of the rider is commonly applied through the front or ball portion of the foot to the pedal 23, the effective leverage will be the distance between the axis of the crank shaft 15 and the axis of the pedal bearing member 21.

The application of pressure to the outer pedal 23 naturally tends to push the outer pedal downward but this necessitates a corresponding rising movement of the inner pedal 24, which is prevented by engagement of the pedal 24 with the rear or heel portion of the rider's foot. The pedal 24 is at a mechanical disadvantage, however, due to its longer leverage, so that an effective downward pressure is applied to the pedal 23 and the rider receives the advantages of the greater leverage when climbing hills or riding over a sandy or otherwise retarding road surface.

As the combined pedal structure remains substantially horizontal under the foot of the wearer, it will be evident that the ground clearance will not be reduced by the increased leverage on the crank shaft, and it will also be evident that the path of travel of the rider's foot is determined solely by the length of the crank arm 16, as in the ordinary construction. Furthermore, our device has the advantage of extreme simplicity, as no ratchets, pawls, gears or other driving connections are required between the pedal frame 20 and the pedal stud 17, the frame 20 being at all times freely rotatable on the stud 17.

For easy and rapid riding, the pedals may be reversed under the rider's feet, bringing the long end of each frame forward.

Having thus described our invention and the advantages thereof, we do not wish to be limited to the details herein disclosed otherwise than as set forth in the claims, but what we claim is:

1. In a bicycle, a crank arm, a pedal stud fixed thereon, a pedal frame freely pivoted on said stud, a pair of pedals rotatably mounted in spaced relation on said pedal frame, and means to hold said pedals yieldingly in aligned relation.

2. In a bicycle, a crank shaft, a crank arm fixed to said crank shaft, a pedal stud fixed to said crank arm, a pedal frame freely pivoted on said stud, and a pair of pedals rotatably mounted in spaced relation on said pedal frame and unequally spaced from the axis of said pedal stud, each pedal comprising two foot-engaging members equally spaced from the pivotal axis of said pedal.

3. In a bicycle, a crank arm, a pedal stud fixed thereon, a pedal frame freely pivoted on said stud, and a pair of pedals rotatably mounted in spaced relation on said pedal frame and unequally spaced from the axis of said pedal stud, said pedal frame being increased in weight at the short end thereof to offset the greater leverage of the pedal at the long end thereof, thereby counterbalancing the pedal assembly.

BROR M. LOFQUIST.
SIXTEN J. OLSON.